June 27, 1961
D. B. DELANOY
2,990,454
TELEPHONE SYSTEMS
Filed Oct. 6, 1958
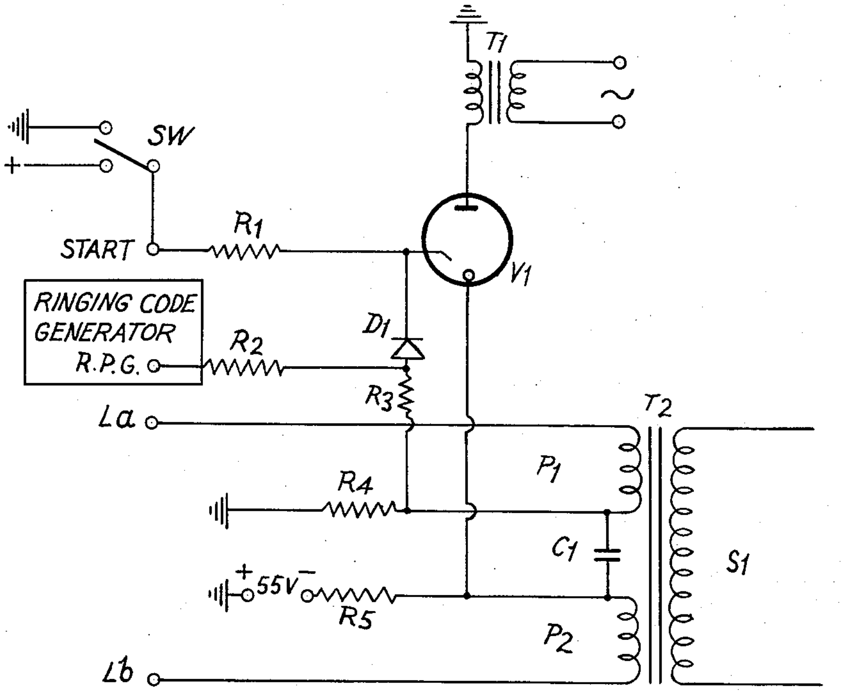
Inventor
D. B. DELANOY
By
Holcombe, Wetherill & Brisebois
Attorneys United States Patent Office 2,990,454

Patented June 27, 1961

2,990,454

TELEPHONE SYSTEMS

Donald B. Delanoy, Cambridge, England, assignor to Pye Limited, Cambridge, England, a British company Filed Oct. 6, 1958, Ser. No. 765,408
Claims priority, application Great Britain Oct. 10, 1957
1 Claim. (Cl. 179—84)

The present invention relates to automatic telephone systems, and more particularly to systems in which the exchange circuits operate electronically.

The present invention has for its object to provide an electronic circuit arrangement for controlling the ringing current to a subscriber.

In order that the invention may be more clearly understood, reference will now be made to the accompanying drawing which shows a circuit diagram of the ringing current control arrangement according to this invention.

*La* and *Lb* are the lines of the subscribers loop across which the ringing current is to be applied. T2 is the line transformer having divided primary windings P1, P2 each being connected to one of the lines *La*, *Lb* and their other ends being connected to ground through resistances R4, R5. In the connection between R5 and ground is connected the microphone supply voltage (55 volts) with the negative pole connected to the resistance R5. The primary windings are connected by the condenser C1.

The ringing current from the transformer T1 is switched by a cold cathode tube V1 and applied to the junction of R5 and C1. The current path is then via P2 and *Lb* to the subscriber's unit, and returning to ground via *La*, P1 and R4.

Speech currents flowing through *La* via P1, C1 and P2 to *Lb* flow through the primary windings P1, P2 in the same direction and induce speech currents into the secondary S1 in the normal way.

Reverting to the switching of the ringing current, the A.C. ringing voltage is applied between the anode of the tube V1 and ground by the transformer T1 and the D.C. voltage of the microphone supply is applied between the cathode of the valve V1 and ground via resistance R5, the cathode being negative with respect to ground. The sum of the A.C. and D.C. voltages is insufficient to cause spontaneous firing of the tube V1.

In the normal quiescent state a voltage is applied to the trigger electrode of the tube V1, via resistance R2 and rectifier D1 from the ringing code generator R.P.G. This voltage (which follows the desired ringing code, rising from zero to some positive potential in accordance with the ringing code) is divided by the resistance R3 and R4 connected to ground, and also by the resistance R1 which is connected to the "start" terminal which is normally at ground potential, so that the potential remaining on the trigger electrode is insufficient to fire the tube.

When it is required to ring the subscriber, a steady D.C. potential is applied to the start terminal via switch SW, and hence to the trigger electrode via R1, to allow the tube to fire. The tube V1 fires on each positive excursion of the R.P.G. supply and consequently passes the ringing current according to the desired ringing code. When the called subscriber lifts his handset, the loop is completed and negative voltage appears at the junction of R4 and R3. This is applied to the tube V1 and is sufficiently negative to block the tube to positive excursions of the R.P.G. supply. The tube V1 thus stops conducting and ringing ceases.

I claim:

In an automatic telephone system, an electronic circuit for switching the ringing current comprising a cold cathode tube having a cathode, an anode and a trigger electrode, a line transformer comprising first and second primary windings and a secondary winding, said first and second primary windings each having one of their ends connected together by a condenser and their other ends connected to a subscriber's loop, a first resistance connected between said one end of the first primary winding and ground, a second resistance connected between said one end of the second primary winding and the negative pole of a microphone supply voltage, the positive pole of which is connected to ground, a connection between said one end of said second primary winding and the cathode of said tube, means for applying an alternating current ringing voltage between the anode of said tube and ground, a third resistance in series with a rectifier connected between said one end of the first primary winding and the trigger electrode of the tube, a ringing code generator producing a varying voltage according to a predetermined ringing code, a fourth resistance connecting the output from said ringing code generator to the junction of said third resistance and the rectifier, a start terminal connected through a fifth resistance to the trigger electrode, and means for applying a D.C. potential to the start terminal, the tube only conducting when both the D.C. potential and the ringing code voltage are applied to the trigger electrode and thereby controlling the ringing voltage applied to the line in accordance with the ringing code.

References Cited in the file of this patent

UNITED STATES PATENTS 2,846,513 Mierlo ---------------- Aug. 5, 1958

FOREIGN PATENTS 699,941 Great Britain ---------- Nov. 18, 1953